United States Patent
Albinger et al.

(10) Patent No.: US 10,762,537 B2
(45) Date of Patent: Sep. 1, 2020

(54) OUTDOOR POWER EQUIPMENT TOOL

(71) Applicant: HUSQVARNA AB, Huskvarna (SE)

(72) Inventors: Matthew Albinger, Shelby, NC (US); Jon Funk, Concord, NC (US); Mario D'Ovidio, Cornelius, NC (US)

(73) Assignee: HUSQVARNA AB, Huskvarna (SE)

( * ) Notice: Subject to any disclaimer, the term of this patent is extended or adjusted under 35 U.S.C. 154(b) by 385 days.

(21) Appl. No.: 15/574,618

(22) PCT Filed: May 20, 2016

(86) PCT No.: PCT/IB2016/052984
§ 371 (c)(1),
(2) Date: Nov. 16, 2017

(87) PCT Pub. No.: WO2016/185447
PCT Pub. Date: Nov. 24, 2016

(65) Prior Publication Data
US 2018/0150885 A1    May 31, 2018

Related U.S. Application Data (60) Provisional application No. 62/164,311, filed on May 20, 2015.

(51) Int. Cl.
*G06Q 30/02* (2012.01)
*G06Q 30/06* (2012.01)
*G06F 16/951* (2019.01)

(52) U.S. Cl.
CPC ..... *G06Q 30/0269* (2013.01); *G06Q 30/0251* (2013.01); *G06Q 30/0631* (2013.01); *G06F 16/951* (2019.01)

(58) Field of Classification Search
CPC .................................................. G06Q 30/0269
(Continued)

(56) References Cited

U.S. PATENT DOCUMENTS

| 8,387,858 B2 | 3/2013 | Bohn et al. | |
| 2008/0033783 A1* | 2/2008 | Tyree | G06Q 30/02 705/7.29 |

(Continued)

FOREIGN PATENT DOCUMENTS

WO    2014008627 A1    1/2014

OTHER PUBLICATIONS

International Search Report and Written Opinion for International Application No. PCT/IB2016/052984 dated Jul. 26, 2016.

*Primary Examiner* — Azam A Ansari
(74) *Attorney, Agent, or Firm* — Burr & Forman, LLP (57) ABSTRACT

A mower may be specifically recommended for a user based on received data associated with a yard of the user. The method may include providing a computing device for a user, and receiving, using the computing device communicating with a computer over a network, particular parameters about the user's yard. The user's yard parameters may be compared with product parameters of mowers stored on a database associated with a retailer. Using the particular parameters about the user's yard received from the computing device, at least one mower matched with the user's needs. The recommendation of the at least one mower may then be provided to the user.

17 Claims, 7 Drawing Sheets

(58) Field of Classification Search
USPC .................................................. 705/14.66
See application file for complete search history.

(56) References Cited

U.S. PATENT DOCUMENTS

| | | | |
|---|---|---|---|
| 2008/0313037 A1* | 12/2008 | Root | G06Q 30/02 |
| | | | 705/14.53 |
| 2009/0222315 A1 | 9/2009 | Hayes, Jr. | |
| 2013/0030879 A1* | 1/2013 | Munjal | G06Q 30/0207 |
| | | | 705/7.42 |
| 2014/0122228 A1 | 5/2014 | Wical | |

* cited by examiner

202 — RECEIVE MOWER SPECIFIC INPUTS (E.G., AMOUNT OF TIME MOWING, AMOUNT OF BLADE STRIKES, RETAIL PROMOTIONS RELATING TO MOWER, ETC.) FROM A COMPUTER (E.G., FROM A PERSONAL COMPUTER; FROM A COMPUTER ON THE MOWER; ETC.) OVER A NETWORK

204 — QUERY DATABASE TO DETERMINE ADVERTISEMENTS TO PRESENT TO THE USER BASED ON THE RECEIVED INPUTS, WHERE THE ADVERTISMENTS RELATE TO THE MOWER (E.G., SELLING AN EXTENDED WARRANTY BASED ON MOWER USAGE AMOUNT SOLD; SELL OIL BASED ON OIL USAGE; PRESENT AN INVENTORY LISTING, NEAREST STORE, ETC.;PRESENT REPLACEMENT PARTS BASED ON THE USAGE OF THE MOWER; ETC.)

206 — PRESENT ADVERTISEMENT OR OTHER INFORMATION TO USER

208 — RECEIVE USER SELECTION OF DESIRED PRODUCT AND PROVIDE USER MORE INFORMATION ABOUT THE PRODUCT

210 — OUTPUT INFORMATION OVER NETWORK REGARDING PRODUCT (E.G., INFORMATION REGARDING SELLING OF PRODUCT OR PROVIDING PRODUCTS FOR MOWER; INFORMATION, PROVIDE INFORMATION TO USER ABOUT HIS MOWER AND/OR MOWER USAGE;

TARGETED ADVERTISING MESSAGE JUST FOR YOU:

You have been mowing for X amount of time and X amount of blade strikes, and your local retailer has a sale on blades. Here's your particular blade and this blade is in stock right now at RETAILER X located at 123 Main Street (which is closest to you).

In stock now: $40. Same day delivery. Click here to order.

Special Offer: Buy 2 blades, get 1 free.

FIG. 4B

TARGETED ADVERTISING MESSAGEs JUST FOR YOU:

Your mower is now 1 year old. We offer an extended warranty of 1 year for $100

Click here to purchase.

Click here if you wish us to help you to sell your current mower.

We recommend the following mower for you:

This mower has more horsepower and will allow you to mow your yard in 7.5 minutes less.
Click here to buy.

OUTDOOR POWER EQUIPMENT TOOL

CROSS REFERENCE TO RELATED APPLICATIONS

This application claims the benefit of U.S. Provisional Application No. 62/164,311 filed on May 20, 2015, the entire contents of which are hereby incorporated herein by reference.

BACKGROUND

Outdoor tasks, such as grooming and maintaining property, are commonly performed using various outdoor power equipment that is configured for the performance of corresponding specific tasks. For example, outdoor power equipment, such as a riding lawn mower, may be used for cutting grass or collecting leaves.

Outdoor power equipment is popular with many people due to the various features thereon, and the demand for such devices having improved functionality will likely grow.

Currently, there is advertising for outdoor power equipment for the general public, which may be disinteresting to outdoor power equipment owners. However, there is currently no way to provide advertising that is targeted for specific individuals/entities. Additionally, the maintenance requirements for owners of outdoor power equipment reduce the customer experience since these owners must find replacement parts and many times the advertising for outdoor power equipment is not helpful for the customers' needs.

BRIEF SUMMARY OF SOME EXAMPLES

Accordingly, in order to improve operator satisfaction in connection with purchasing and using outdoor power equipment (e.g., a mower), some example embodiments may generally relate to systems, such as a retail systems for collecting data points from a customer and for using the collected data points to provide advertising to potential customers with customer specific product and/or service offerings, customer relevant information, and the like.

In an example embodiment, a mower may be specifically recommended for a user based on received data associated with a yard of the user. The method may include providing a computing device for a user, and receiving, using the computing device communicating with a computer over a network, particular parameters about the user's yard. The user's yard parameters may be compared with product parameters of mowers stored on a database associated with a retailer. Using the particular parameters about the user's yard received from the computing device, at least one mower matched with the user's needs. The at least one mower may then be recommended to the user.

In another example embodiment, an system for generating product recommendations relating to outdoor power equipment is provided and may include a computing device configured to receive, to a computer over a network, particular parameters about outdoor power equipment of a particular user; a display to display an advertising or other information to the user based on the received particular parameters about the outdoor power equipment of the particular user; and a processor in communication with a database associated with a retailer. The processor may be configured for: querying an advertising database with the particular parameters to determine if any matches exist in the database; determining that at least one product associated with the user's outdoor power equipment is a match in the database with the particular parameters received; and outputting, to the display, a product recommendation or retail store information to the user based on the received particular parameters about the user's outdoor power equipment.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "lawn care" is meant to relate to any yard maintenance activity and need not specifically apply to activities directly tied to grass, turf or sod care. As used herein, operable coupling should be understood to relate to direct or indirect connection that, in either case, enables functional interconnection of components that are operably coupled to each other. The terms "customer" and "user" will also be used interchangeably.

General Overview

Prior to going into detail about various embodiments of the present application, described hereinafter is a general overview of a system and method for targeted advertising of an outdoor power tool and for using the targeted advertising to provide a customer with customer specific product and/or service offerings/recommendations. By way of example, and referring to FIG. 2A, mower specific inputs (e.g., an amount of mowing a mower has been in operation, amount of blade strikes of a mower, retail promotions specifically relating to the user's particular mower, etc.) may be received by the system from a computer associated with the user's outdoor power equipment (e.g., directly from a computer resident on the user's outdoor power equipment, the user's personal computer, from a social network site using specific data from the user's account, etc.), as provided by block 202. In block 204, the system determines which advertisements/products are the best fit for the user based on the received inputs by querying a database associated with the user's specific outdoor power equipment from block 204. The system then may output the recommended product(s) or advertisement associated with the user's outdoor power equipment to the user, in block 206. At block 208, the user may select a particular recommended product to obtain more information about the product, such as information about how long it would take the selected mower to mow the user's yard, the cost of the recommended product, where the recommended product can be purchased, and the like. In block 210, information is then output over a network regarding the selected product or advertisement.

In described embodiments, the subject system may reside on a first computing device, such as a tablet or kiosk computing device operated by a retail entity or representative thereof. The recommendation system may capture from the customer, answers to posed questions relating to the parameters of the user's yard, such as what is the width of the user's gate or how large is the user's yard.

The received product recommendation may then be stored within a data repository with the recommendation being linked to a customer identifier that is associated with the customer.

While the forgoing provides a general overview of some of the various features and functionalities of the subject invention, a better understanding of the objects, advantages, features, properties, and relationships of the subject invention will be obtained from the following detailed description and accompanying drawings which set forth illustrative embodiments and which are indicative of the various ways in which the principles of the subject invention may be employed.

DETAILED EXPLANATIONS OF VARIOUS EMBODIMENTS

With reference to the figures, the following describes a system and method for collecting data points from a customer, for using the collected data points to provide customer specific offerings/recommendations, incentives, information, and the like, and for rewarding sales associates based upon their involvement in the process.

Figure 1:
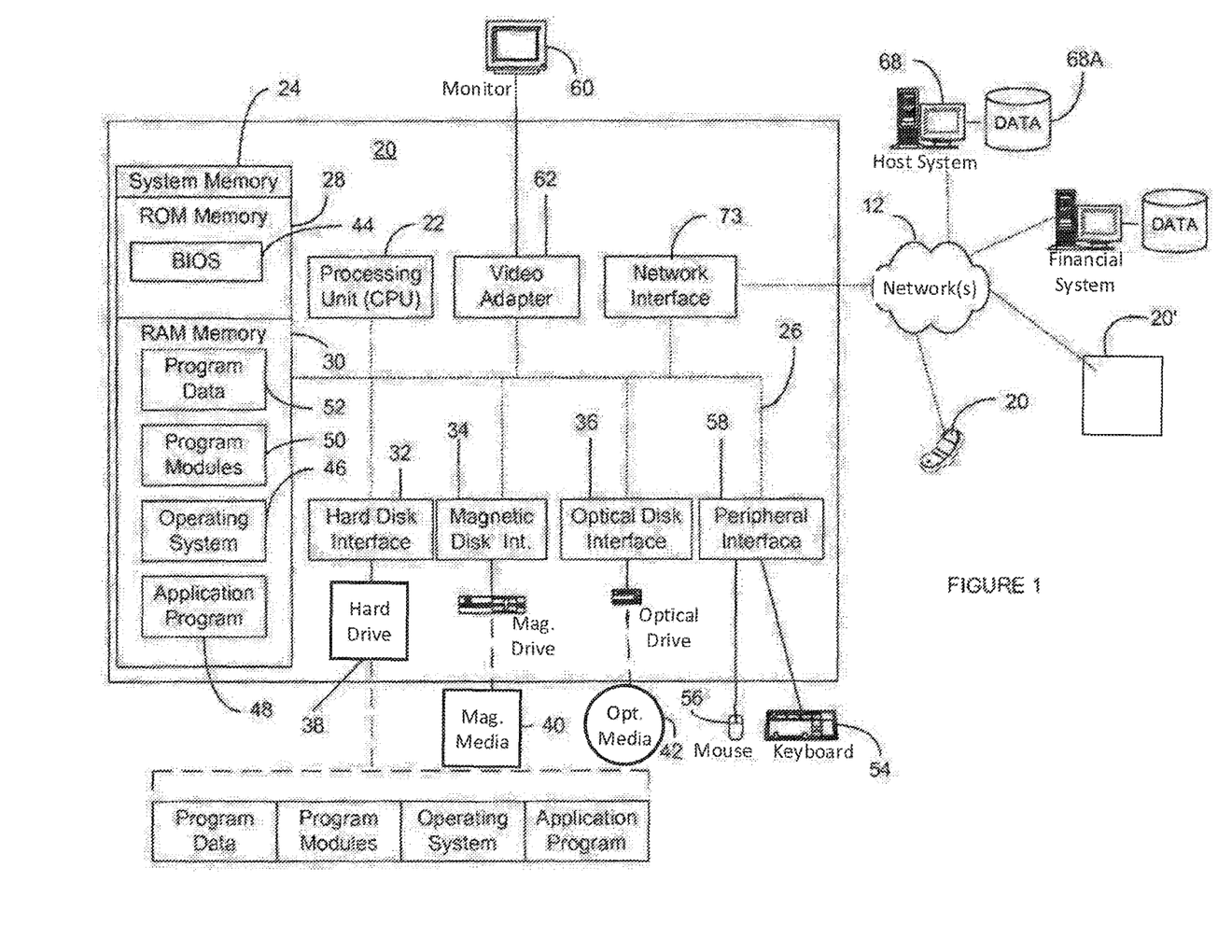
FIG. 1 illustrates in block diagram of components of an exemplary system relating to outdoor power equipment tools for collecting data from a customer and recommending products to the customer in accordance with some embodiments.

Turning to FIG. 1, illustrated is an exemplary system for collecting data from a customer and for using the collected data to provide enhanced product recommendations specifically tailored for the user in a manner that is described in greater detail hereinbelow. As illustrated, the exemplary system includes a processing device 20 whereby a customer may register with and/or otherwise access an online retail channel hosted by a retailer system 68 associated with one or more retail establishments to, among other things, provide a custom product recommendation/advertising, which may allow the customer to view and purchase a recommended product being offered for sale by the retail establishment(s).

The user (or customer) may use software employed on various devices, such by an application on the user's smartphone (that is configured to connect with retailer's databases), at a kiosk or other computing device at a retail dealer, on an outdoor power equipment attachment (that could be installed into the user's outdoor power equipment to communicate data directly from the user's outdoor power equipment over a network).

As will be appreciated, during the registration process the customer may establish a log-in name/password combination for providing secure and recognized access to the retailer system 68, provide a contact email address, phone number, or other unique identifier, provide demographic information such as age, gender, preferences, interests, etc. The user data may also indicate a physical address where the user lives as well as if any products that are known that the user owns.

It should be understood that the customer need not actually register, but data may automatically be collected from the customer's outdoor power equipment, according to one embodiment.

As a result of the registration process (which may also be done by the customer while online or within the retail establishment), the customer may be associated with a unique customer ID (or user ID), which customer ID may, but need not, be reflected on a physical and/or digital rewards card that may be provided to the customer. For example, the customer ID may be reflected in a device having a machine readable code, such as a barcode imprinted on a physical rewards card or be otherwise displayable/transmittable via use of a device such as a smart phone. Using the same or another processing device, the customer may additionally receive, from the retailer system 68, digital incentives or other communications that will be associated with their customer ID.

While illustrated in the exemplary form of a personal computer, it is to be understood that the processing device 20 may be embodied in any type of device having the ability to execute instructions such as, by way of example only, a personal-digital assistant ("PDA"), a smart phone, a tablet computing device, or the like. Furthermore, while described and illustrated in the context of a single processing device 20, those skilled in the art will also appreciate that the various tasks described herein may be practiced in a distributed environment having multiple processing devices linked via a local or wide-area network, such as the Internet, whereby the executable instructions may be associated with and/or executed by one or more of the multiple processing devices.

More particularly, to provide a means for a purchaser to access the online channel of the retailer(s) (and to perform various tasks as necessary) the processing device 20 may include a processing unit 22 and a system memory 24, which may be linked via a bus 26.

Without limitation, the bus 26 may be a memory bus, a peripheral bus, and/or a local bus using any of a variety of known bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated physically embodied, i.e., non-transitory, computer-readable media allow for the storage of instructions, data structures, program modules, and the like for execution by the processing unit 22 of the processing device 20. Those skilled in the art will further appreciate that other types of physically embodied computer-readable media that can store data and/or executable instructions may be used for this same purpose. Examples of such media devices include, but are not limited to, magnetic drives, flash memory cards or drives, random access memories, nano-drives, memory sticks, and other read/write and/or read-only memories. Meanwhile, the program modules that may be stored in one or more of the memory/media devices may include a basic input/output system (BIOS) 44 which contains the basic routines that help to transfer information between elements within the processing device 20, such as during start-up, an operating system 46, one or more applications programs 48 (such as a Web browser), other program modules 50, and/or program data 52.

To allow a customer to enter commands and information into the processing device 20, e.g., to create or upload task related instructions or to enter data about the user's yard, to search for and purchase product, upload images of the user's yard, etc., input devices such as a touch pad or keyboard 54 and/or a pointing device 56 are provided. While not illustrated, other input devices may include a microphone, a joystick, a game pad, a scanner, a camera, etc. These and other input devices would typically be connected to the processing unit 22 by means of an interface 58 which, in turn, would be coupled to the bus 26. Input devices may be connected to the processing unit 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as speakers and printers.

As noted above, the processing device 20 may also utilize logical connections to one or more remote processing devices, such as the retailer system 68 having an associated data repository 68A. As will be understood, the data repository 68A may maintain a database of product that is being sold by the retailer(s), customer related information (including information about features or data of the customer's outdoor power equipment, such as the total time the outdoor power equipment has been in operation, current outdoor power equipment products the customer owns, number of blade strikes the customer's mower has incurred, when maintenance has last been performed (e.g., time or run hours since last maintenance or a date of the last maintenance), location of the customer relative to retail locations, etc.), and the like. While the retailer system 68 has been illustrated in the exemplary form of a server computer, it will be appreciated that the retailer system 68 may, like processing device 20, be any type of device having processing capabilities. Similarly, it will be appreciated that the retailer system 68 need not be implemented as a single device but may be implemented in a manner such that the tasks performed by the retailer system 68 are distributed amongst a plurality of processing devices/databases located at the same or different geographical locations and linked through a communication network. Additionally, the retailer system 68 may have logical connections to other third party systems 80 via the network 12 and, via such connections, will be associated with functions that are supported by and data repositories that are linked to such other third party systems. Such third party systems may include, without limitation, systems of banking, credit, or other financial institutions, systems of third party providers of product, systems of shipping/delivery companies, systems that support social networking, etc.

For performing tasks as needed, the retailer system 68 may include many or all of the elements described above relative to the processing device 20. In addition, the retailer system 68 may generally include executable instructions that are likewise stored on physically embodied memory devices for, among other things, supporting online retail channel services, supporting physical retail channel services, i.e., in store, maintaining records, etc. The retailer system 68 may thus include links to point-of-sale (POS) devices, e.g., kiosks, cash registers, etc., that are located within one or more retail stores without limitation. As will also be described in greater detail hereinafter, the retailer system 68 further has instructions for storing and using captured information related to the user's yard and outdoor power equipment needs (e.g., as captured by the recommendation tool or system using a processing device 20) to, among other things, provide customer specific recommendations. To this end, the system may incorporate an advertisement, recommendation or selection engine which utilizes techniques to discern relationships between the data collected and data stored about products in the database 68A.

Communications between the processing devices 20/20' and the retailer system 68 may be exchanged via a further processing device, such as a network router, that is responsible for network routing. Communications with the network router may be performed via a network interface component 73. Thus, within such a networked environment, e.g., the Internet, World Wide Web, LAN, or other like type of wired or wireless network, it will be appreciated that program modules depicted relative to the processing devices 20/20', or portions thereof, may be stored in the memory storage device(s) associated with the retailer system 68 or may be stored on processing devices 20/20' themselves.

It should be further understood that any operations that occur on the host retailer system 68 may alternatively, or in addition, be performed on the processing devices 20/20'.

As noted above, the retailer system 68 includes instructions for storing and using data points collected from a customer to, among other things, provide customer specific offerings and/or informational services. The collected data points may be reflective of a specific customer's experiences as well as the specific customer's outdoor power equipment needs relative to one or more retail establishment(s), i.e., the captured data points are reflective of variables associated with the user's particular outdoor power equipment. Inputs may relate to limiting factors of the user's outdoor power equipment, such as the mower's blade strike count, mower's operation time, mower's maintenance information, mower's replacement part schedule, etc., relative to the user's outdoor power equipment so that a retailer can understand the needs of the user relative to the user's outdoor power equipment. There may be other various received data (e.g., location of the customer, how quickly the customer uses certain parts, retailer stock information relative to parts needed by the customer, etc.).

As discussed above, such data points captured for a specific customer would be associated with a customer ID, e.g., phone number, email address, a physical or digital rewards card having an associated machine readable indicia, or the like.

Figure 2A:
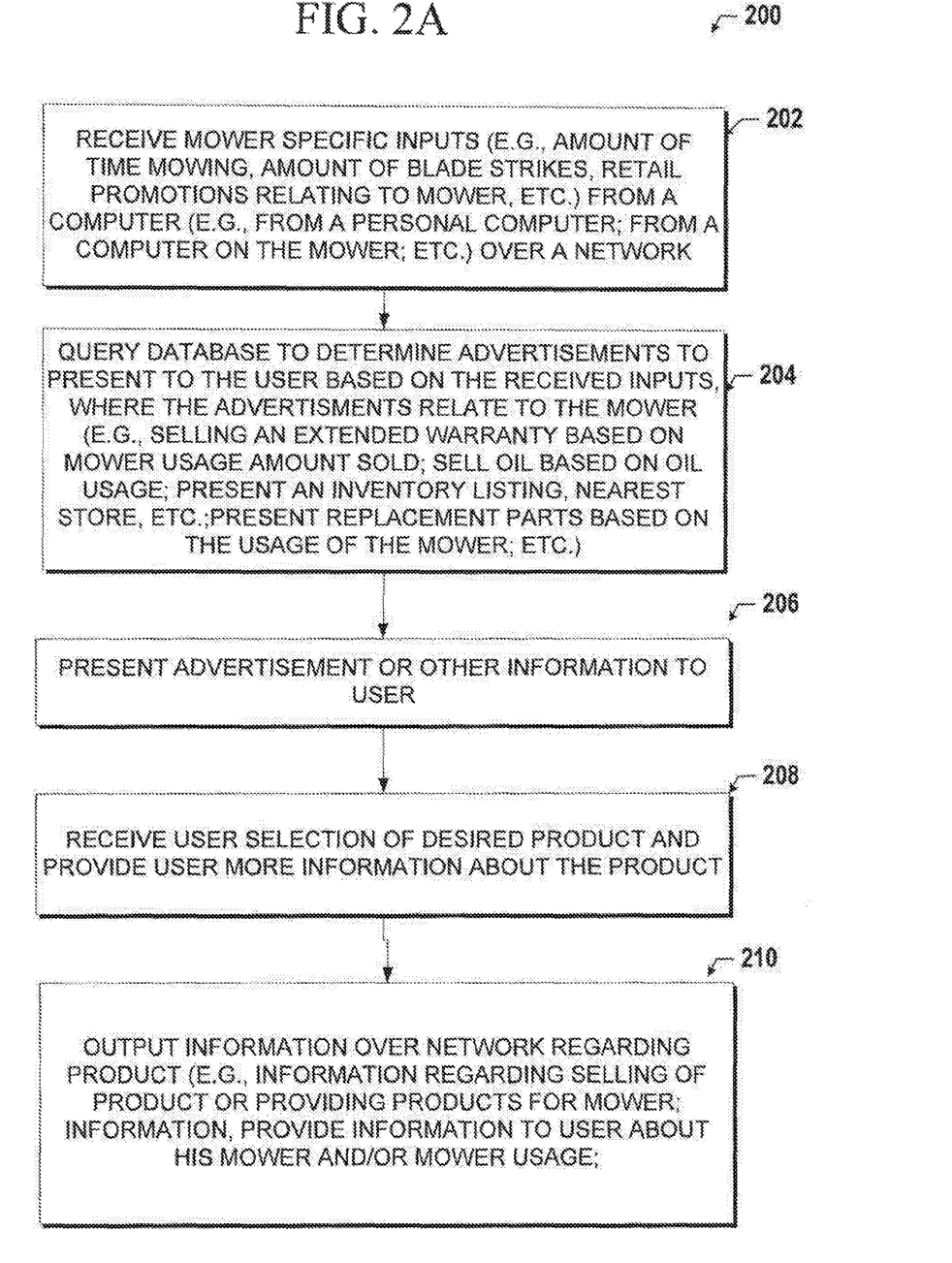
FIG. 2A illustrates a flow chart diagram of exemplary steps used to collect data points from a customer and for using the collected data points to provide product recommendations, in accordance with some embodiments.
Figure 2B:
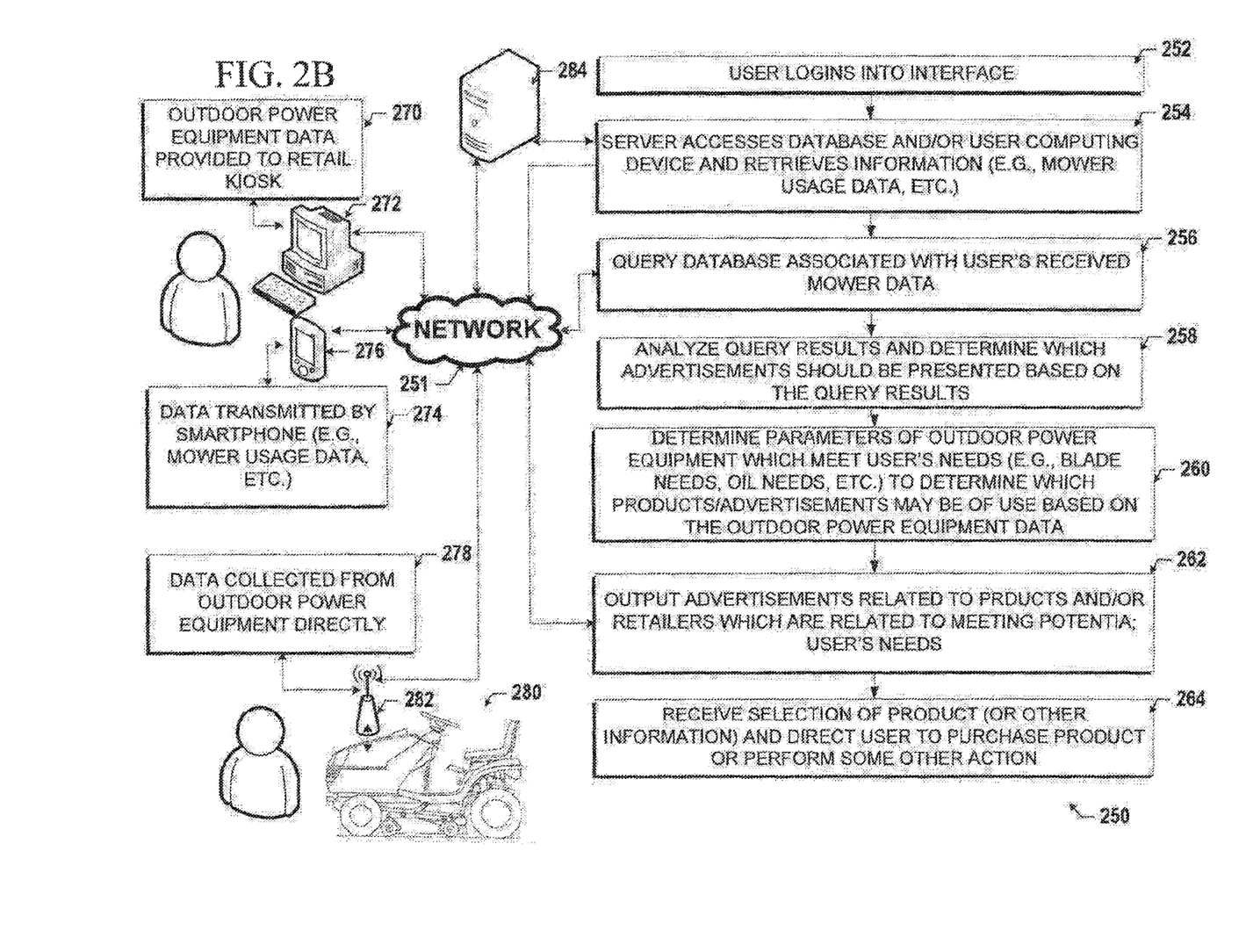
FIG. 2B illustrates another flow chart diagram of exemplary steps used to collect data points from a customer and for using the collected data points to provide product recommendations, in accordance with some embodiments.

For collecting data points from a specific customer while that customer is using the user's outdoor power equipment, it is contemplated that a data collecting and analysis procedure may be utilized as generally illustrated in FIG. 2B. By way of non-limiting example, the data collecting and analysis procedure may be initiated by the retailer (e.g., server 284).

In FIG. 2B, at block 252, the user logins into the system using a graphical user interface (as mentioned earlier, this step may be optional). At block 254, the system accesses the user profile data and retrieves data relating to the parameters of the user's current outdoor power equipment device, and the like to gain information about the user's current outdoor power equipment's particular parameters. As mentioned above, the data retrieved can be (1) any outdoor power equipment information tailored to the particular customer, including information that may be pertinent relative to products that a retailer sells (e.g., replacement parts (e.g., blades, belts, chains, etc.), replacement or additional outdoor power equipment itself, warranty, maintenance products (e.g., oil, gas, etc.)), (2) information about the retailer itself relative to the particular customer from whom data was retrieved (e.g., location of the retailer closest to the customer's residence, same day delivery) in order to provide targeted advertising to the customer, and (3) customer related information (e.g., social networking relative to the customers' outdoor power equipment, customers selling their outdoor power equipment, etc.).

The data can allow for the retailer (or dealer) to perform at least two functions including: (1) provide advertising particularly tailored for a specific customer based on data received from that specific customer's particular outdoor power equipment; and (2) increase or decrease inventory based on an aggregate of customer's outdoor power equipment data received.

Referring back to FIG. 2A, at block 256, data is received relating to the user's outdoor power equipment and/or needs of the user relative to the user's outdoor power equipment. As mentioned above, this can be achieved through the use of guided questions and other collected data. The data can be manually entered by the user or may be automatically retrieved from pre-stored memory or obtained directly from the mower's metrics.

It should be noted that the data may be collected by data being collected by a computing device 272 (similar to element 20 mentioned above) which may be a server/computer at a retail establishment, as shown in block 272. In another embodiment, data is collected through the user's smartphone 278 which may be connected to the user's outdoor power equipment.

Figure 3A:
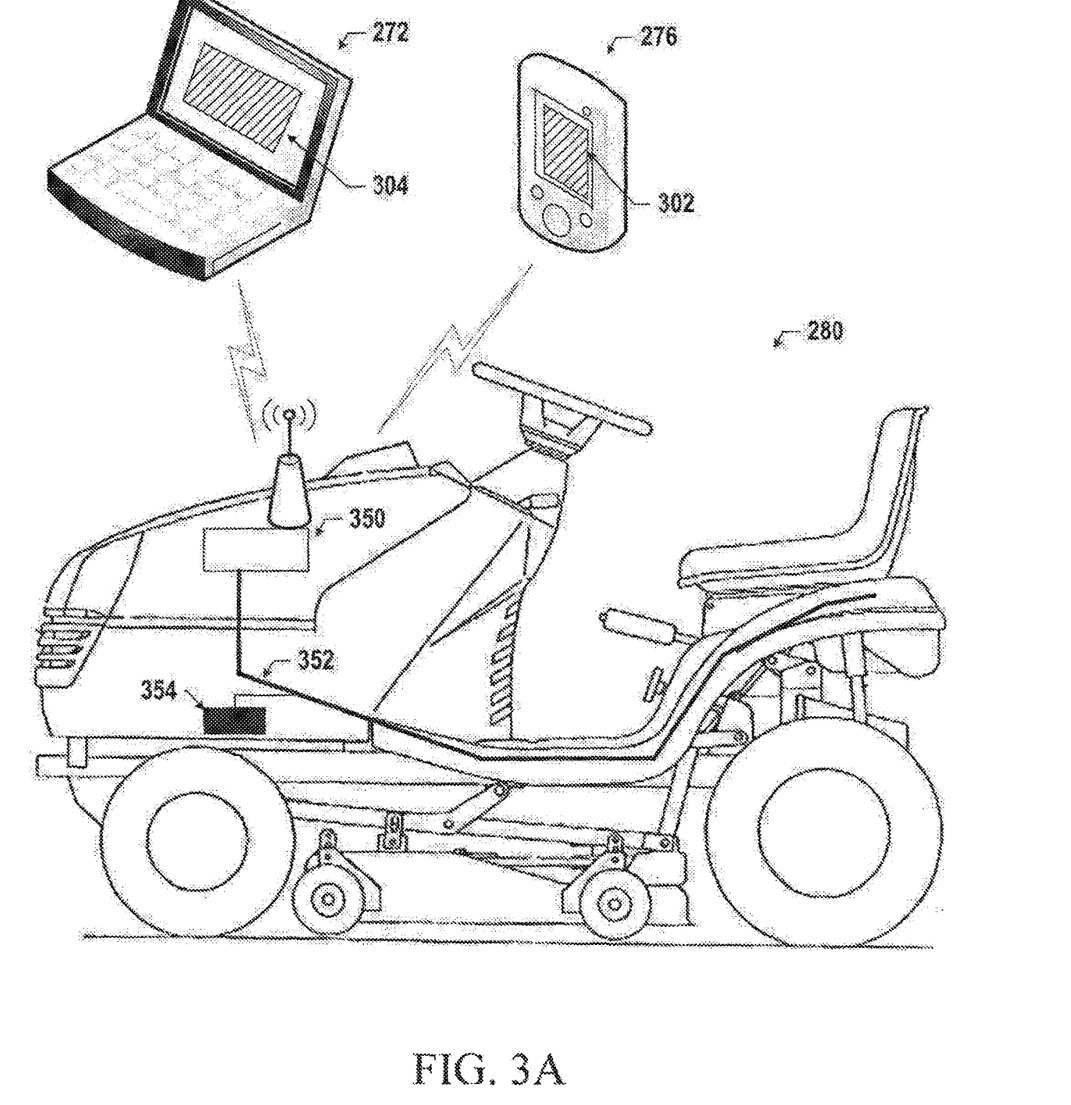
FIG. 3A illustrates an electrical system of a riding lawn care vehicle with short-range wireless capability according to an example embodiment.

The data may also be collected using an attachment 282 that plugs or connects to the outdoor power equipment, such a mower 280. The attachment 282 collects various information and data about the mower 280 as indicated in block 278 and as discussed in more depth relative to FIGS. 3A-3C. In FIG. 3A, the mower 280 has a block 350 for receiving the attachment 282 which then may operate as plug-n-play or which may be pre-installed by the manufacturer. The attachment 282 may then be connected to bus 352 which may have one or more sensors 354 and may be connected to a computer on the mower 280. The computer then may access data from the sensors 354 and pre-stored information about the mower 280 that could then be provided to the system through attachment 282.

Figure 3B:
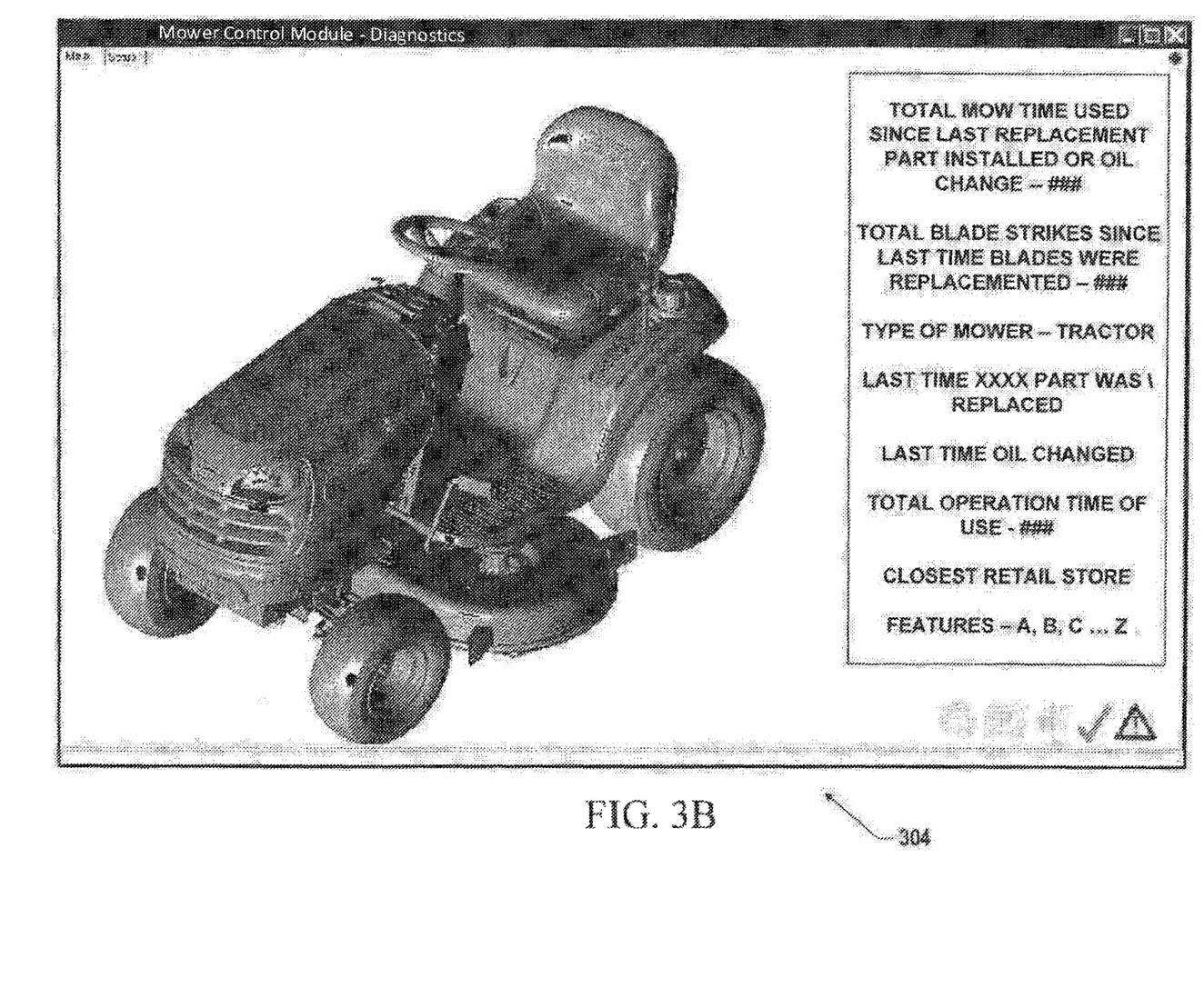
FIG. 3B illustrates a graphical user interface of a computer connected with an electrical system for a riding lawn care vehicle according to an example embodiment.
Figure 3C:
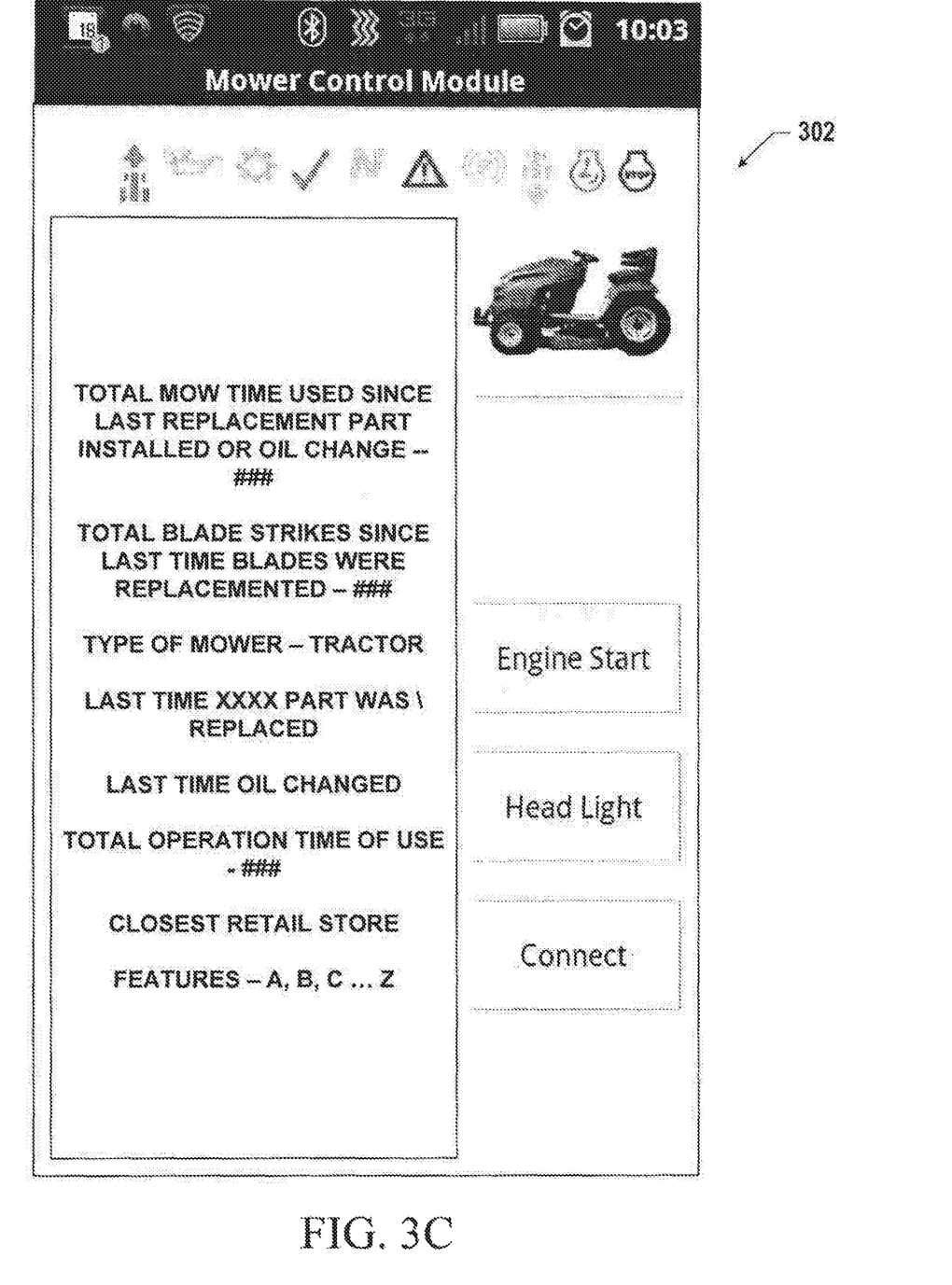
FIG. 3C illustrates a graphical user interface of a mobile phone connected with an electrical system for a riding lawn care vehicle according to an example embodiment.

The attachment 282 may also be able to communicate to terminal 272 or smartphone 276 to provide detailed information on the display screen via GUIs 302 and 304, as indicated by FIGS. 3B-3C. For example, the attachment 282 may be able to access not only current technical features of the mower 280, such as the type of mower, the horsepower capacity, cutting deck size, other features/components of the mower, etc., but could also could obtain operational data information including the total mow time of the mower (since last replacement part installed, oil change, and/or for all time), total blade strikes (since last time blades were installed), average RPMs, average blade speed, average mower speed, and the like. Any of this information can be communicated to the system and/or to the smartphone 276 and terminal 272. This information may be referred to as particular parameters that are specifically from only the customer owning the outdoor power equipment associated with this data.

FIGS. 3B-3C show that the user can view the particular parameters being transferred to or retrieved by the retailer/dealer's server.

As shown in FIGS. 3A and 2B, the devices may communicate over network 251 (which is similar to network 12 of FIG. 1) and may be separate and/or remote from each other. For example, the smartphone 276 may be remote from the retail system 68. Moreover, the devices discussed herein may communicate with database 284 (similar to database 68A of FIG. 1) over the network 251.

After the data is collected, the system then may determine which product, advertisement, or data is the best fit for the particular user, such as a walk-behind mower, a lawn tractor, a zero-turn tractor, and the like, based on the inputted data, as shown in block 258. For example, if the user's mower has exceeded a predetermined amount of blade strikes, the system may determine that a replacement blade is needed and will advertise to the user that replacement blades are on sale at a nearby retailer. It is noted that at least feature 258 may be optional.

In block 260, after the system determines the applicable product categories, the system may then filter which specific products, advertisements, data are right for the user. It should be noted that the system may return products from categories other than the applicable specifically-targeted products and the present invention should not be limited to only presenting products from the targeted product.

The system matches parameters input into the system with parameters stored on database 284 and a score is then produced based on the number of matched parameters. For example, if the user has an outdoor power equipment that has not had an oil change in one month, but has been mowing more than a predefined amount, the system may match this information to pre-stored information to determine a score of whether the customer is likely to need oil for his outdoor power equipment. In this regard, the system further queries all products that are rated for handling such oil replacement. Moreover, if the user is determined to need a different or specific horsepower (based, for example, on a speed requirement the user prefers), the system selects all mowers having at least such horsepower. For each match to the criteria, a calculation score for each respective mower is increased and stored on the system until a final calculation score is determined. The products having the highest calculation score and/or those products that meet all of the user's criteria are selected as a recommended targeted advertisement for the user.

In block 262, the system outputs the recommended products that meet the user's needs (or at least are the closest fit to the user's needs based on the determined calculation score). The output may then show the user how to more efficiently mow his yard with different products (e.g., 15 minutes less with replacement blades, 15 minutes less with a mower with more horsepower, etc.), how much horsepower the user really needs, etc. This is done for all of the recommended products in a table format so that the user can compare the recommended products.

Figure 4A:
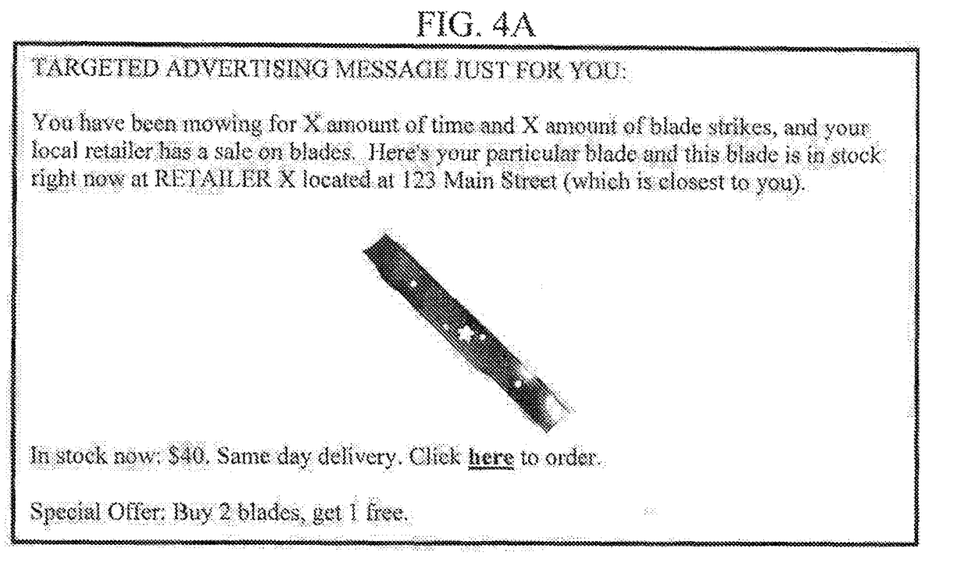
FIGS. 4A-4B show exemplary targeted advertisements presented to the customer based on particular parameters collected from the customer's outdoor power equipment, according to one embodiment.
Figure 4B:
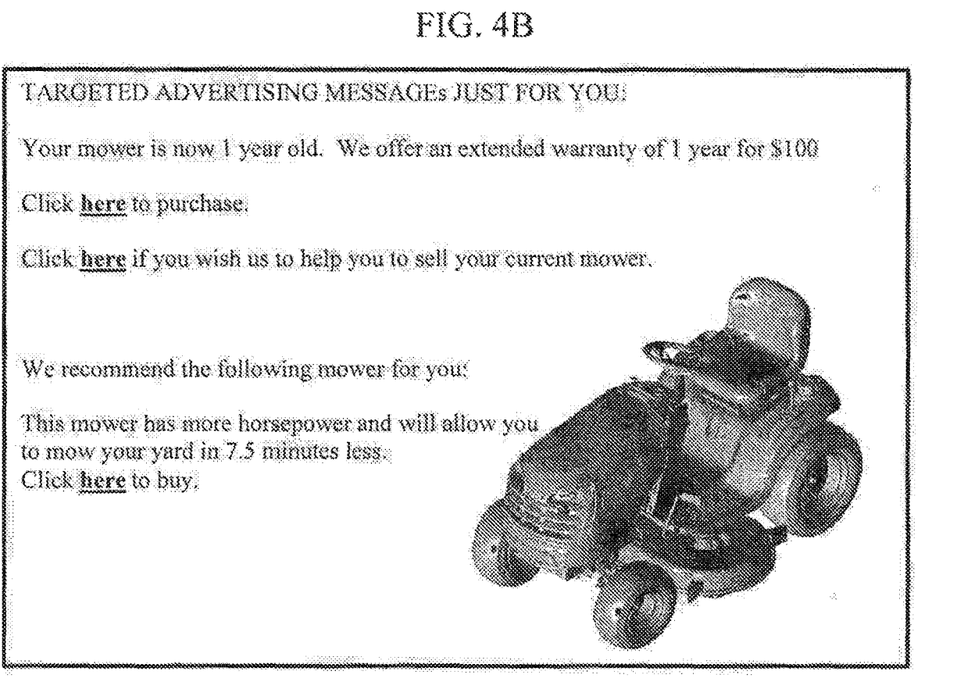

FIGS. 4A-4B show exemplary targeted advertisements presented to the customer based on particular parameters collected from the customer's outdoor power equipment, according to one embodiment. FIG. 4A provides a message to the customer via a display screen associated with the user (e.g., a display screen on the user's smartphone, a display screen of the mower, on the user's television screen, etc.) that provides information about a replacement part (in this example, a blade). The replacement part advertisement is presented to the user based on the particular parameters of the user, including the number of blade strikes of the user exceeding a predetermined threshold for the user's mower, the user's location, and the like. The targeted advertisement identifies the closest retailer, the replacement part that the user needs for his mower, the price of the part, information on delivery, a link to order the part, and a coupon or special offer. Other information may also be included including directions to the closest retailer. Also shown is a picture of the replacement which the targeted advertisement is presenting to the user.

FIG. 4B shows another targeted advertisement to the user. This ad presents multiple options: 1—an extended warranty based on the user's mower exceeding a predefined age (or other criteria) with a link to buy the extended warranty; 2—a link to help the user sell the lawn mower, and 3—an offer to help the user buy a new model of the mower based on the particular parameters about the user's mowing and the user's needs for mowing his yard (for example). The system may host a system to help the user sell his used mower and then advertises a new mower for the user to buy to replace his sold mower.

At block 264, through use of the recommendations provided to the customer, the customer can return to a store associated with the retailer to make a purchase and/or the customer may interact with the system and review all the recommended items to obtain more information therefrom, such as the costing information, warranty information, product descriptions, etc. The system may additionally provide links whereby the customer can add product(s) to their shopping cart and complete their purchase online. As will be appreciated, data associated with a purchase of a product, whether online or in-store, and/or data points associated with the customer viewing product online may be captured and uploaded to the system server 68 for inclusion in the customer's profile.

The system may also host or be a part of a social network between outdoor power equipment users. Users of such social media can post various information, photos, video, questions, and/or comments relating to his outdoor power equipment. The system then may access this information to get a "feel" of the community and needs of users in an aggregated manner. It should be noted that the system may also set their own inventory because they can use the information from the social network to gather information about local usage, efficiency of usage, etc.

As mentioned above, aspects of the present application allow for the retailers some ability to communicate with a retailer's database. In this regard, retailers and dealers can use this information to predict how many products will be bought, especially based on a history of data that is to be collected and trends. For example, 50,000 mowers in the Charlotte, N.C. area are going through X amount of oil in the area and so the retailers could increase inventory due to knowing that users will need more oil.

Elements of embodiments of the present invention, such as methods 200 and 250 of FIGS. 2A-2B, may be embodied in hardware and/or software as a computer program code that may include firmware, resident software, microcode or the like. Additionally, elements of the invention may take the form of a computer program product on a computer-usable or computer-readable storage medium having computer-usable or computer-readable program code embodied in a medium for use by or in connection with a system. Examples of such a medium are illustrated in FIG. 1 in computer system 20 as a memory 28, 30. A computer-usable or readable medium is any medium that contains, stores, communicates or transports the program for use by or in connection with a system. The medium, for example, is an electronic, magnetic, optical, electromagnetic, infrared or semiconductor system or the like.

As will be appreciated by one of skill in the art, the methods of the present invention, such as methods 200 and 250 of FIGS. 2A-2B, may be embodied as a method (including, for example, a computer-implemented process, and/or any other process), apparatus (including, for example, a system, machine, device, computer program product, and/or the like), or a combination of the foregoing. Accordingly, embodiments of the methods of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized in methods 200 and 250 of FIGS. 2A-2B. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method for presenting recommendations relating to outdoor power equipment, the method comprising:
    receiving, using a server communicating with a computing device over a network, particular parameters about outdoor power equipment of a particular user, the particular parameters including operational data provided by one or more mower sensors disposed on a current mower of the particular user, the one or more mower sensors being configured to collect the operational data regarding operation of the current mower of the particular user, the operational data being transmitted by the current mower to the server for receipt by the server;
    querying an advertising database with the particular parameters to determine if any matches exist in the advertising database;
    determining that at least one product associated with the outdoor power equipment of the particular user is a match in the advertising database based on the particular parameters received; and
    outputting a product recommendation or retail store information to the particular user based on the particular parameters received about the outdoor power equipment of the particular user;
    wherein the particular parameters about the outdoor power equipment of the particular user comprise a number of blade strikes of the current mower of the particular user.

2. The method of claim 1, further comprising:
    receiving input from the particular user through a computing device of the particular user over the network to the computing device.

3. The method of claim 1, further comprising:
receiving input from the particular user through a kiosk of a retailer over the network to the computing device.

4. The method of claim 1, wherein the particular user is associated with a user identifier, the user identifier being associated with profile information about the particular user.

5. The method of claim 4, wherein the profile information of the particular user is aggregated with other user profile information to determine information associated with the product recommendation.

6. The method of claim 1, wherein outputting the product recommendation or retail store information to the particular user is performed in response to the operational data provided by the one or more mower sensors disposed on the current mower of the particular user exceeding an operational threshold.

7. A system for providing recommendations related to outdoor power equipment, the system comprising:
a computing device configured to receive, from a computer over a network, particular parameters about outdoor power equipment of a particular user, the particular parameters including operational data provided by one or more mower sensors disposed on a current mower of the particular user, the one or more mower sensors being configured to collect the operational data regarding operation of the current mower of the particular user, the operational data being transmitted by the current mower to the computer for receipt by the computer, the particular parameters about the outdoor power equipment of the particular user comprising a number of blade strikes of the current mower of the particular user;
a display configured to display advertising or other information to the particular user based on the received particular parameters about the outdoor power equipment of the particular user;
a processor in communication with a database associated with a retailer, the processor configured for:
querying an advertising database with the particular parameters to determine if any matches exist in the advertising database;
determining that at least one product associated with the user's outdoor power equipment is a match in the advertising database with the particular parameters received; and
outputting, to the display, a product recommendation or retail store information to the particular user based on the particular parameters received about the outdoor power equipment of the particular user.

8. The system of claim 7, wherein the computing device comprises an attachment that connects to the current mower of the particular user to transmit the particular parameters associated with the outdoor power equipment of the particular user.

9. The system of claim 7, wherein the computing device comprises a computer located at the retailer and configured to be connected to the network.

10. The system of claim 7, wherein the particular parameters about the outdoor power equipment of the particular user further comprises a total use time of the mower of the particular user, oil change information of the mower of the particular user, product and/or model information of the outdoor power equipment of the particular user, what desired replacement parts the particular user needs, and a location of the particular user to determine a closest retail store associated with the particular user.

11. The system of claim 7, wherein the computing device is further configured to analyze the particular parameters to determine replacement parts that the outdoor power equipment of the particular user needs.

12. The system of claim 7, wherein the particular user is associated with a user identifier, the user identifier being associated with profile information about the particular user.

13. The system of claim 12, wherein the profile information of the particular user is aggregated with other user profile information to determine information associated with the product recommendation.

14. A non-transitory computer readable medium embodying a computer program comprising instructions for presenting advertising relating to outdoor power equipment, the computer instructions, when executed by a computer, performs a method, the method comprising:
receiving, using a server communicating with a computing device over a network, particular parameters about outdoor power equipment of a particular user, the particular parameters including operational data provided by one or more mower sensors disposed on a current mower of the particular user, the one or more mower sensors being configured to collect the operational data regarding operation of the current mower of the particular user, the operational data being transmitted by the current mower to the server for receipt by the server;
querying an advertising database with the particular parameters to determine if any matches exist in the advertising database;
determining that at least one product associated with the outdoor power equipment of the particular user is a match in the advertising database with the particular parameters received; and
outputting a product recommendation or retail store information to the particular user based on the particular parameters received about the outdoor power equipment of the particular user;
wherein the particular parameters about the outdoor power equipment of the particular user comprise a number of blade strikes of the current mower of the particular user.

15. The non-transitory computer readable medium of claim 14, wherein the method further comprises:
receiving input from the particular user through the computing device of the particular user over the network to the computing device.

16. The non-transitory computer readable medium of claim 14, wherein the method further comprises:
receiving input from the particular user through a kiosk of a retailer over the network to the computing device.

17. The non-transitory computer readable medium of claim 14, wherein the particular user is associated with a user identifier, the user identifier being associated with profile information about the particular user and wherein the profile information of the particular user is aggregated with other user profile information to determine information associated with the product recommendation.

* * * * *